United States Patent [19]

Fuse et al.

[11] Patent Number: 4,578,005

[45] Date of Patent: Mar. 25, 1986

[54] MACHINING REFORMING APPARATUS FOR ELECTRODE OF RESISTANCE WELDING MACHINE

[75] Inventors: Genzo Fuse, Higashimatsuyama; Kaoru Abe, Tsurugashima; Isao Matsumoto, Kawagoe, all of Japan

[73] Assignee: Honda Giken Kogyo Kabushiki Kaisha, Tokyo, Japan

[21] Appl. No.: 564,533

[22] Filed: Dec. 22, 1983

[30] Foreign Application Priority Data

Dec. 24, 1982 [JP] Japan .................. 57-225923
Dec. 24, 1982 [JP] Japan .................. 57-225924
Jun. 16, 1983 [JP] Japan .................. 58-106785

[51] Int. Cl.⁴ .............................................. B23C 3/12
[52] U.S. Cl. ........................... 409/140; 407/9; 409/139; 409/181; 409/218
[58] Field of Search ............. 409/180, 181, 139, 140, 409/218; 407/9, 33, 34, 36, 37; 144/28.3, 28.6, 28.7, 30; 29/76 R, 78

[56] References Cited

U.S. PATENT DOCUMENTS

| 2,284,483 | 5/1942 | Whitesell, Jr. ............ 407/33 X |
| 2,286,931 | 6/1942 | Radeke ..................... 409/181 X |
| 2,418,767 | 4/1947 | Hall ........................... 409/181 X |
| 2,638,817 | 5/1953 | Hall ........................... 407/33 X |
| 2,930,289 | 3/1960 | Swarts ....................... 409/181 X |
| 3,289,274 | 12/1966 | Brucato ....................... 407/9 |

FOREIGN PATENT DOCUMENTS

| 53-34268 | 3/1978 | Japan . |
| 524348 | 8/1940 | United Kingdom . |
| 624590 | 6/1949 | United Kingdom . |
| 1189104 | 4/1970 | United Kingdom . |

Primary Examiner—Z. R. Bilinsky
Assistant Examiner—Steven C. Bishop
Attorney, Agent, or Firm—Armstrong, Nikaido, Marmelstein & Kubovcik

[57] ABSTRACT

The present invention is directed to machining reforming apparatus for machining electrodes of a resistance welding device. The apparatus comprises a body having an insertion portion for receiving at least one electrode and at least one rotary cutter, the cutter having a cutter portion adapted to extend along a peripheral inclined surface on a front portion of an electrode. A receiving base member is positioned within the body on the axis of rotation of the rotary cutter, wherein the receiving base member is adapted to abut a front end surface of an electrode. The cutter portions are biased radially inward towards an electrode, the biasing device maintaining proper contact between the edge of the cutter and the electrode.

6 Claims, 8 Drawing Figures

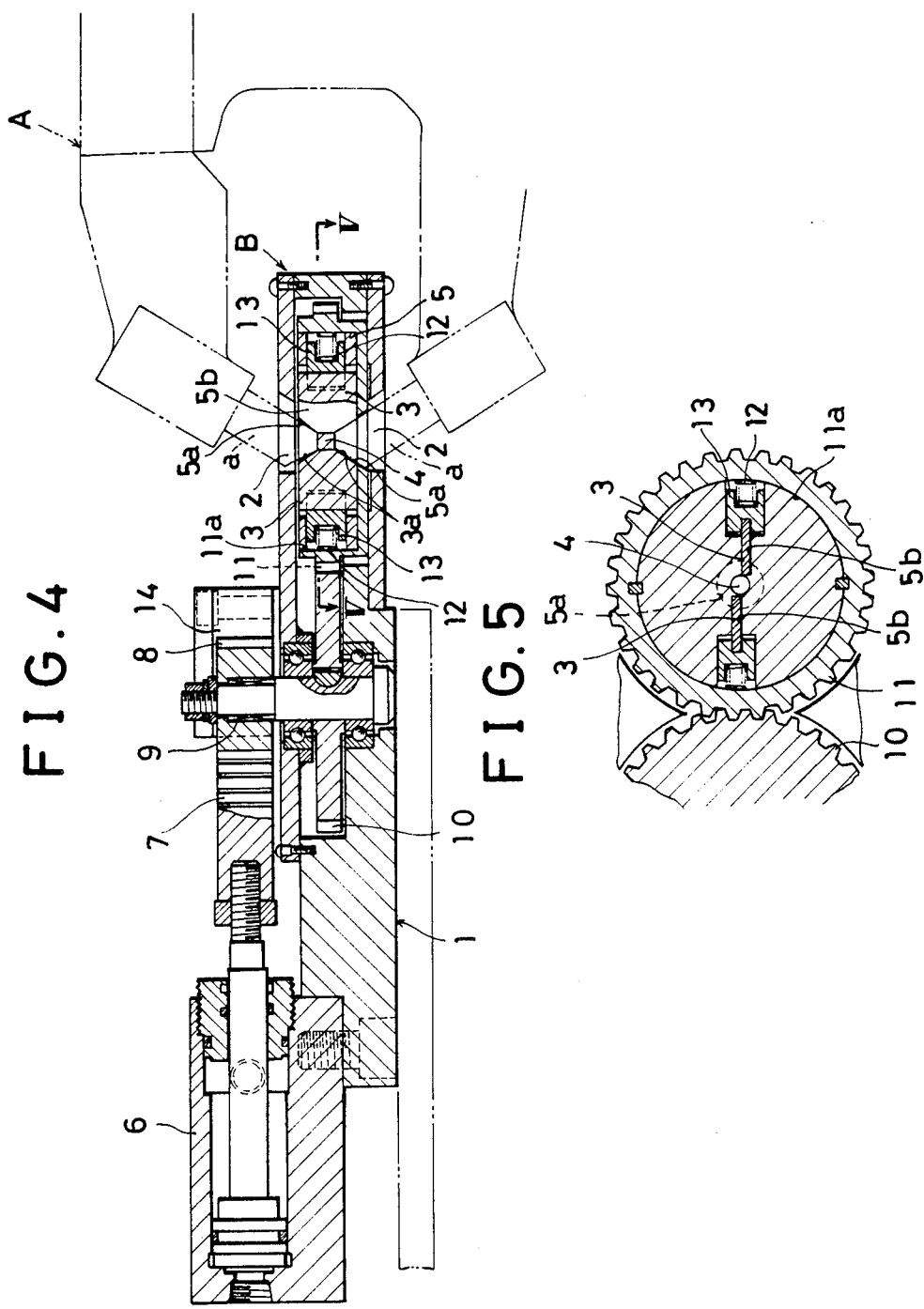

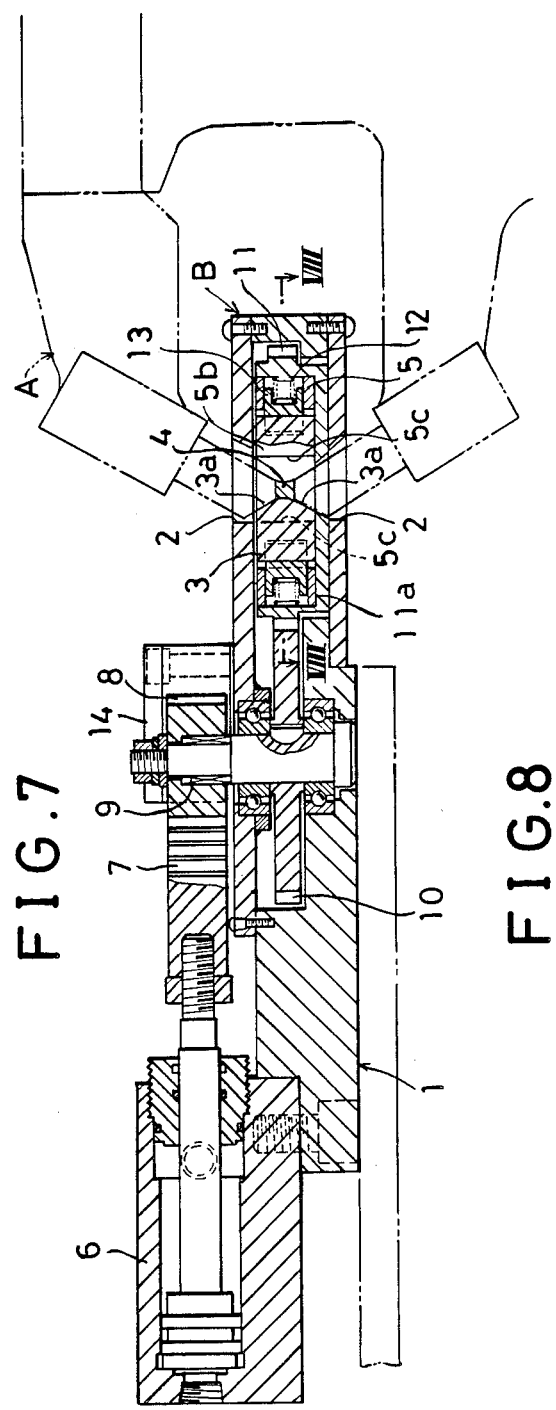
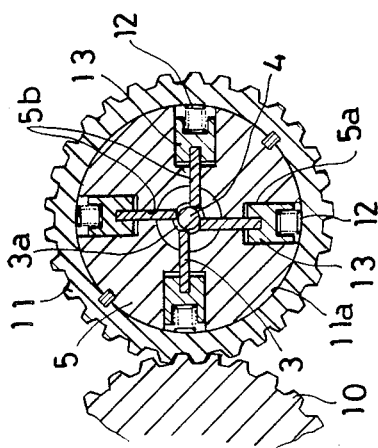
FIG. 7
FIG. 8

MACHINING REFORMING APPARATUS FOR ELECTRODE OF RESISTANCE WELDING MACHINE

BACKGROUND OF THE INVENTION

1. Field of the Invention:

The present invention relates to a machining reforming apparatus for an electrode of a resistance welding apparatus such as a spot welding machine or the like.

2. Description of the Prior Art:

Generally in a welding machine, if an electrode a thereof is used repeatedly, the periphery of the front end surface thereof is deformed with an outwardly annular projecting portion b, as shown in FIG. 1, and if such a deformed electrode a is not removed, there is a change in the electric current density. Therefore, it is necessary that the electrode a be subjected, at repeated time intervals, to a machining reforming treatment for removing the projecting portion b. An apparatus for carrying out this treatment is disclosed in Japanese Unexamined Utility Model Application No. Sho 52-22423. In this apparatus, a rotary cutter is used which has a cavity form that is coincident with the form of the front end portion of the electrode. The electrode to be reformed may be cut from its periphery to its front end surface. This treatment, however, has the disadvantage that the front end surface of the electrode has a fine unevenness resulting from the cutting, and accordingly, it requires a finishing treatment, such as grinding, to the uneven front end surface after cutting for making the surface smooth. Thus, the amount of machining becomes comparatively large and consequently the useful life of the electrode is shortened.

SUMMARY OF THE INVENTION

It has been ascertained that a front end surface of an electrode of a resistance welding machine can be hardened so that it does not make any fusion adhesion of slag or the like, owing to the fact that, at the time of a welding operation, the front end surface is heated and cooled repeatedly and is also applied with repeated pressures. Consequently, in normal operation, the machining of the front end surface can be eliminated.

It is the primary object of the present invention to provide an apparatus which does not machine the front end surface of the electrode of a resistance welding machine, but rather, machines only the periphery thereof for removing the projecting portion, thereby obtaining a reformed electrode with an extended useful life.

The present invention is directed to a machining reforming apparatus for machining electrodes of a resistance welding device. The apparatus comprises a body having an insertion means for receiving at least one electrode and at least one rotary cutter means, the cutter means having a cutter portion adapted to extend along a peripheral inclined surface on a front portion of an electrode. A receiving base means is positioned within the body on the axis of rotation of the rotary cutter means, wherein the receiving base means is adapted to abut a front end surface of an electrode. The cutter means are biased radially inward towards an electrode, the biasing means maintaining proper contact between the edge of the cutter and the electrode.

BRIEF DESCRIPTION OF THE DRAWINGS

FIG. 4 is a sectional view taken along the line IV—IV in FIG. 3.

FIG. 5 is a sectional view taken along the line V—V in FIG. 4.

FIG. 7 is a sectional view taken along the line VII—VII in FIG. 6.

FIG. 8 is a sectional view taken along the line VIII—VIII in FIG. 7.

DETAILED DESCRIPTION OF THE PREFERRED EMBODIMENTS

Figure 1:
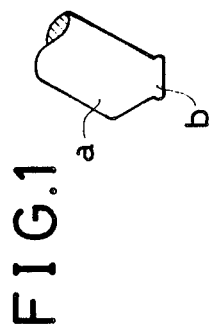
FIG. 1 is a side view showing an electrode prior to being reformed.
Figure 2:
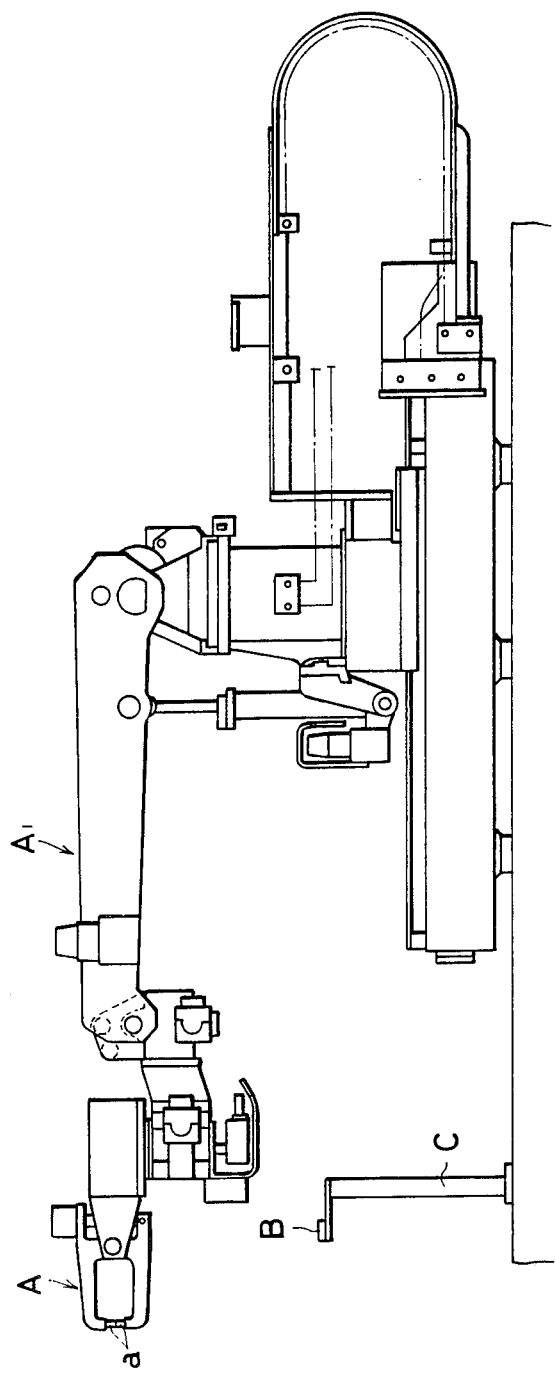
FIG. 2 is a side view showing a positional relationship between a resistance welding machine and the apparatus of the present invention.

Referring to FIG. 2, a resistance welding machine A is attached to a front end of a robot $A_1$, and a machining reforming apparatus B of the prenent invention is mounted on a stand C provided on one side of the robot $A_1$. When a pair of electrodes a, a attached to the welding machine A are deformed with outwardly projecting portions b, b as shown in FIG. 1, the welding machine A is moved by operation of the robot $A_1$ to the reforming apparatus B so that machining reforming of the two electrodes a, a may be carried out.

Figure 3:
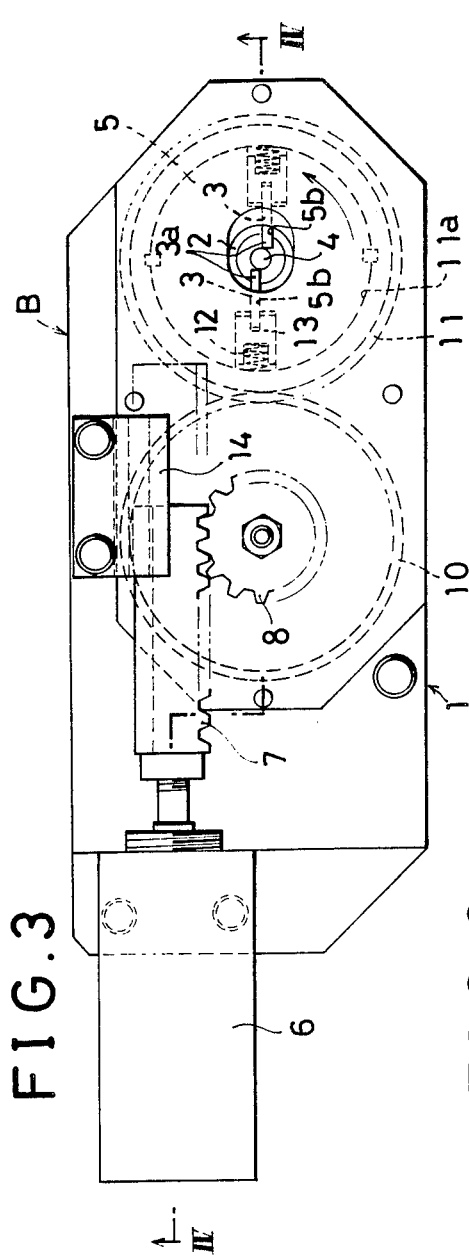
FIG. 3 is a top plan view of the present invention.

The reforming apparatus B, as shown in FIGS. 3 to 5 has a front end portion comprising a main body 1 fixed to the stand C. The main body 1 has an electrode insertion portion 2 for receiving the two electrodes a, a, which are inserted from upper and lower sides thereof. The insertion portion 2 is provided with a rotary cutter 2 having a pair of upper and lower cutter portions 3a, 3a formed to extend along the inclination of the peripheral surfaces of the front end portions of the two electrodes a, a, and a receiving base 4 having no cutter portion is provided on the axis of rotation of the rotary cutter 3 positioned between front end surfaces of the two electrodes a, a. A rotary disk 5 has at its center, a pair of upper and lower electrode insertion cavity portions 5a, 5a, and the receiving base 4 is positioned between the portions 5a, 5a. The pair of rotary cutters 3, 3 are engaged with the cavity portions 5a, 5a, so as to be rotatable therewith. The rotary disk 5 is mounted in and is brought into key engagement with a central hollow portion 11a of a driven gear 11, which meshes with a driving gear 10 and is arranged to be driven to rotate intermittently through a rack 7, a pinion 8 and a one-way clutch 9 by a cylinder 6 provided on the main body 1. Thus, if the cylinder 6 is operated, the rotary disk 5 is rotated, and the two rotary cutters 3, 3 are rotated therewith, so that the front end surfaces of the two electrodes a, a, which are received in the receiving base 4, are not machined, but only the projecting portions b, b on the peripheries thereof are machined and thus, removed by means of the rotary cutters 3, 3.

Though the object of this invention can be achieved using the above structure, if the rotary cutters 3, 3 are set at predetermined cutting positions and are immovable in the radial direction, when the two electrodes a, a of the welding machine A are inserted by a high pressure device, which is substantially the same as that used at the time of welding, the cutter portions 3a, 3b of the rotary cutters 3, bite deeply into the projecting portions b, b of the electrodes a, a and this makes it difficult to start the rotation of the rotary cutters 3.

For preventing this, the pressure applied at the time of insertion of the electrode for machining reforming work is decreased so that each cutter portion 3a is prevented from biting into each turned portion 3b. However, this is inconvenient in that it requires differentiating the pressure at the time of welding and at the time of machining. It, thus becomes necessary to provide a complicated control circuit, and consequently, the apparatus becomes high in cost and misoperation thereof is liable to take place.

In an effort to overcome this problem, the two electrodes a, a may be inserted, one after another, into the insertion portion 2 but this lowers the working efficiency of the apparatus.

The present invention overcomes this problem by making each of the rotary cutters 3, 3 movable to advance and retract in radial directions, so that even if the two electrodes a, a are inserted into the insertion portion 2 under a high pressure substantially equal to that applied at the time of welding, the respective rotarty cutters 3, 3 may be moved outwards in the radial direction, so that each cutter portion 3a thereof is prevented from biting into each turned portion b.

More in detail, each of the rotary cutters 3, 3 is inserted into and is brought into slidable engagement with a radially extending slit 5b made in the rotary disk 5, and also is urged resiliently inwards in the radial direction through an abutment member 13 by a spring 12 provided on the outside of the abutment member 13 in the radial direction. Thus, when the electrodes a, a are being inserted, the respective rotary cutters 3, 3 may be retraced outwards against the action of the springs 12, 12, and after staring of the rotary cutters 3, 3, the cutters 3, 3 may be advanced inwards, while cutting the projecting portions b, b, under the force of the springs 12, 12, until the cutters reach predetermined cutting end positions at which the cutters 3, 3 are brought into abutment with the side surface of the receiving base 4. In this case, the receiving base 4 has no cutter portion, and, therefore, there is no difficulty in starting which would otherwise be caused by the biting of the cutter portion into the front end surface of the electrode.

When the rotary cutters 3, 3 are arranged to be driven intermittently through the rack 7 connected to the cylinder 6 and the pinion 8 as described above, there is the advantage that the rotary cutters 3, 3 can be rotated at a high output and at a low speed against the action of a load. The rack 7 has a support 14.

In the foregoing embodiment, the receiving base 4 is fixed in position and accordingly, accurate machining cannot be carried out if there is a discrepancy between the inserted positions of the electrodes a, a and the electrode insertion portion 2. Therefore, it is desirable that any discrepancy can be absorbed or eliminated.

Figure 6:
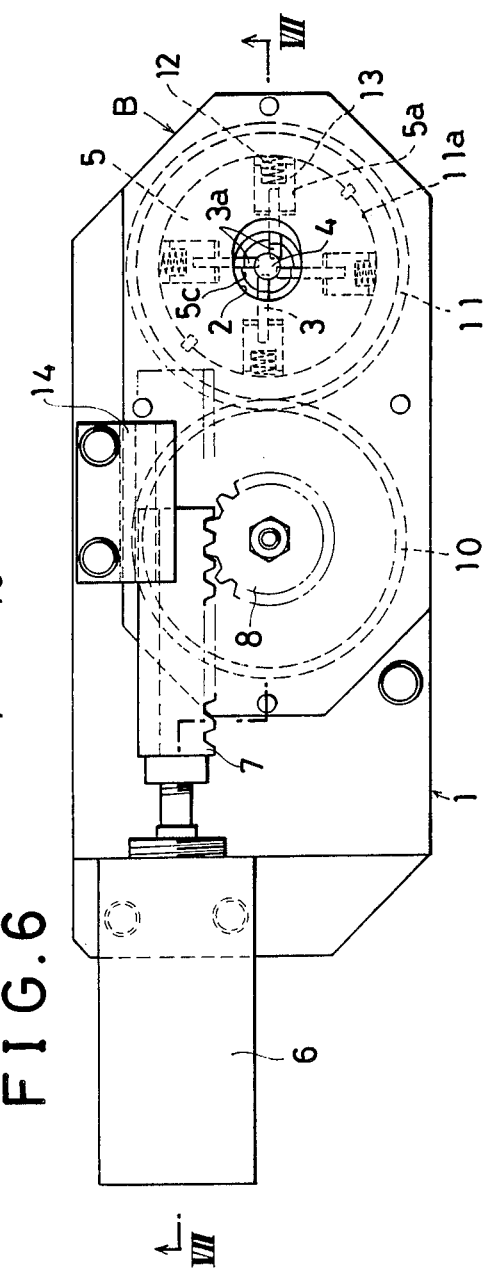
FIG. 6 is a top planb view of another embodiment of the present invention.

A second embodiment of the present invention as shown in FIGS. 6 to 8 overcomes the above described problem. In this embodiment, at least three rotary cutters 3, 3, 3 are disposed circumferentially around the receiving base 4, and the receiving base 4 is held by the front end portions of the rotary cutters 3, 3, 3, which are movable in the radial direction.

In more detail, the rotary disk 5, which is arranged to be driven to rotate in almost the same manner as in the previous embodiment, is provided with four slits 5b, 5b, 5b, 5b disposed circumferentially, and the four rotary cutters 3, 3, 3, 3 are inserted into and brought in slidable engagement with each corresponding slit 5b. Each of the rotary cutters 3, 3, 3, 3 is urged inwards through an abutment member 13 by a spring 12. In the previous embodiment, the receiving base 4 is formed at the center of the rotary disk 5 to be integral therewith. However, in the alternative embodiment, the rotary disk 5 has a central opening 5c in the center thereof, and the piece constituting the receiving base 4 is positioned in the opening 5c, and is held by the front end portions of the four rotary cutters 3, 3, 3, 3.

With this arrangement, even if the electrodes a, a to be inserted are eccentric in relation to the electrode insertion portion 2, each rotary cutter 3 is moved in the radial direction in accordance with the electrodes a, a, at the time of electrode insertion, and thus, movement of the receiving base 4 is also in the radial direction. The receiving base 4 is thus, positioned at a concentric position with respect to the electrodes a, a, and the eccentricity thereof can be absorbed. If, thereafter, the rotary disk 5 is rotated, the respective rotary cutters 3, 3, 3, 3 are rotated around the respective electrodes a, a, to gradually cut off the projecting portions b, b thereof, and at the same time are advanced by the resilient force of each spring 12 to the predetermined positions at which they are in abutment with the side surfaces of the receiving base 4. A predetermined machining reforming of the electrodes a, a can thus, be achieved.

Thus, according to the present invention, the front end surface of the electrode is received in a receiving base having no cutter portion and is, therefore, not subjected to machining. Only the projecting portion on the periphery thereof is machined to be removed by means of the rotary cutter. Unnecessary machining of the electrode can thus, be avoided and the useful life of the electrodes can be extended.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A machining reforming apparatus for machining electrodes of a resistance welding device, said apparatus comprising;
    (a) a body, said body having an insertion means for receiving at least one electrode;
    (b) receiving base means positioned within said body for abutting a front end surface of an electrode inserted therein; and
    (c) at least one rotary cutter means rotatable in said body about an axis substantially perpendicular to said base means, said cutter means having a cutter portion for removing from the electrode inserted therein portions on said electrode projecting only from sides of said front end surface abutting said base means.

2. A machining reforming apparatus as set forth in claim 1, wherein said insertion means receives a pair of said electrodes therein, one electrode being inserted from each side of said body, said receiving base means is positioned between the front end surfaces of said pair of electrodes and said at least one cutter means is at least two cutter means, each cutter means having a said cutter portion in a radial direction towards a corresponding one of the electrodes.

3. A machine reforming apparatus as set forth in claim 2, wherein said at least two cutter means comprises at least three cutter means positioned circumferentially around said receiving base means and said cutter means extends radially to engage said receiving base means to thereby hold said base means.

4. A machine reforming apparatus as set forth in claim 2, wherein said biasing means comprises an abutment means engaging said cutter portion and spring means for applying a radially inward force to said abutment means.

5. A machine reforming apparatus as set forth in any one of claims 1–4, wherein said cutter means includes a rotary disk, said cutter portion being mounted on said rotary disk, and said apparatus includes drive means for rotating said rotary disk.

6. A machine reforming apparatus as set forth in claim 5, wherein said drive means comprises a pinion for engaging said rotary disk, a rack for engaging said pinion and cylinder means coupled to said rack for reciprocating said rack.

* * * * *